United States Patent
Moon et al.

(10) Patent No.: US 7,330,474 B2
(45) Date of Patent: Feb. 12, 2008

(54) APPARATUS FOR DISTRIBUTIVELY PROCESSING BGP AND METHOD THEREOF

(75) Inventors: Se-Woong Moon, Seongnam (KR); Byung-Gu Choe, Seoul (KR); Yong-Seok Park, Yongin (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 774 days.

(21) Appl. No.: 10/778,391

(22) Filed: Feb. 17, 2004

(65) Prior Publication Data

US 2004/0160969 A1     Aug. 19, 2004

(30) Foreign Application Priority Data

Feb. 19, 2003   (KR) ................... 10-2003-0010504

(51) Int. Cl.
*H04L 12/28* (2006.01)
(52) U.S. Cl. ..................................... 370/401
(58) Field of Classification Search ............. 370/401, 370/400, 402, 392, 389, 351, 238, 252, 253, 370/356, 522; 709/241, 238, 240, 230, 223
See application file for complete search history.

(56) References Cited

U.S. PATENT DOCUMENTS

| | | | |
|---|---|---|---|
| 6,006,261 A | 12/1999 | Ratcliff et al. | |
| 6,055,561 A | 4/2000 | Feldman et al. | |
| 6,078,963 A | 6/2000 | Civanlar et al. | |
| 6,084,859 A | 7/2000 | Ratcliff et al. | |
| 6,487,172 B1 | 11/2002 | Zonoun | |
| 6,505,255 B1 | 1/2003 | Akatsu et al. | |
| 6,526,054 B1 | 2/2003 | Li et al. | |
| 6,611,872 B1 | 8/2003 | McCanne | |
| 6,636,895 B1 | 10/2003 | Li et al. | |
| 6,658,000 B1 | 12/2003 | Raciborski et al. | |
| 6,704,795 B1 * | 3/2004 | Fernando et al. | ............ 709/237 |
| 6,760,777 B1 * | 7/2004 | Agarwal et al. | ............ 709/238 |
| 7,139,242 B2 * | 11/2006 | Bays | .......................... 370/238 |

FOREIGN PATENT DOCUMENTS

WO     WO 02/23361      3/2002

\* cited by examiner

*Primary Examiner*—Chi Pham
*Assistant Examiner*—Alexander O. Boakye
(74) *Attorney, Agent, or Firm*—Robert E. Bushnell, Esq.

(57) ABSTRACT

In an apparatus for distributively processing a border gateway protocol (BGP) and a method thereof, a central processing unit does not process all tasks for processing the BGP, and distributed BGP processing units are formed in the central processing unit so that each distributed BGP processing unit manages TCP sessions with external BGP routers belonging to the distributed BGP processing unit. Information is internally transmitted in the distributed BGP processing units using a multicast scheme and a broadcast scheme so that loads can be distributed. The apparatus comprises a number of BGP routers existing externally, a BGP router corresponding to a server, and a number of distributed BGP processing units in the BGP router. The distributed BGP processing units only manage the BGP routers connected directly to each distributed BGP processing unit in accordance with an operator's policy. When each distributed BGP processing unit receives update information from the external BGP routers connected directly to it, it performs a filtering function for deciding whether or not a route is to be transmitted in accordance with an INPUT policy, a route-map function for a transmission path mapping, and a damping function for deciding whether or not the update information is to be transmitted in accordance with a threshold value when flapping occurs.

19 Claims, 4 Drawing Sheets

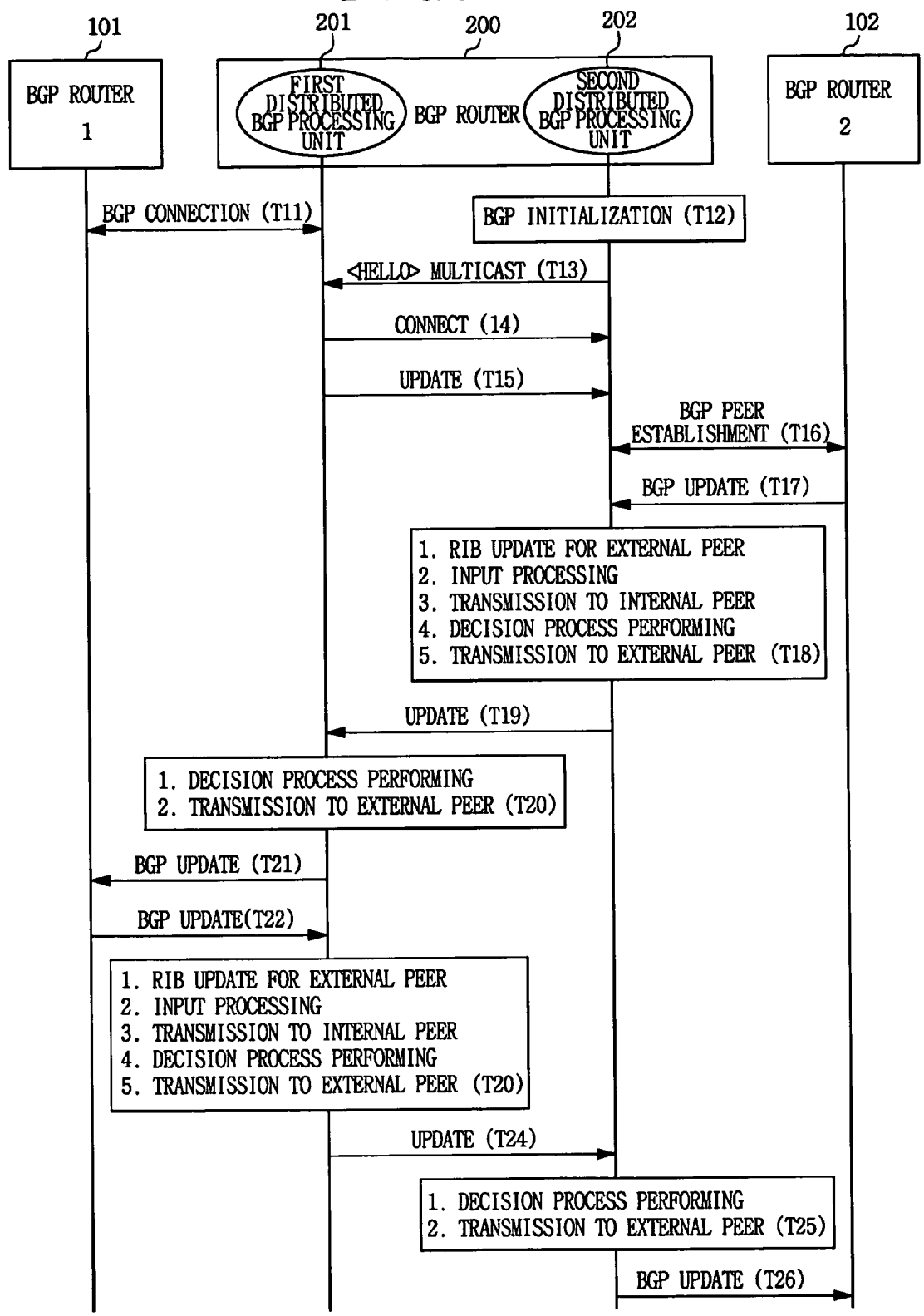

APPARATUS FOR DISTRIBUTIVELY PROCESSING BGP AND METHOD THEREOF

CLAIM OF PRIORITY

This application makes reference to, incorporates the same herein, and claims all benefits accruing under 35 U.S.C. §119 from an application for APPARATUS FOR DISTRIBUTIVELY PROCESSING BGP AND METHOD THEREOF earlier filed in the Korean Intellectual Property Office on 19 Feb. 2003 and there duly assigned Serial No. 2003-10504.

BACKGROUND OF THE INVENTION

1. Field of the Invention

The present invention relates to a Border Gateway Protocol (BGP) and, more particularly, to an apparatus for distributively processing a BGP and the method thereof.

2. Description of the Related Art

Generally, a router uses a routing protocol in order to transmit an Internet Protocol (IP) datagram correctly, and a BGP is a scheme for exchanging routing information between Autonomous Systems (ASs) among the routing protocols.

Hereinafter, the routing protocol will be explained in order to assist in understanding the BGP.

A general routing protocol is substantially divided into an Interior Gateway Protocol (IGP) and an Exterior Gateway Protocol(EGP).

IGP is a routing protocol used in a domain, and representative protocols for IGP currently used in IPv4 include a Routing Information Protocol (RIP), an Open Shortest Path First (OSPF), an Intermediate System to Intermediate System (IS-IS), and so on.

The EGP is a protocol used to exchange routing information between different domains, especially between ASs, and representative protocols for EGP used in Ipv4 include the BGP, and so on. While the EGP transmits the routing information between two or more ASs, the IGP transmits the routing information in one AS. Accordingly, there is a lot of traffic in the BGP since the BGP transmits routing information from one AS to another AS.

Generally, a BGP router has a central processing unit for all routers, in which BGP functions are mainly processed.

A BGP router system is composed of a number of BGP routers to N existing externally, and a BGP router corresponding to a server. The BGP router may include a central processing unit.

The central processing unit manages all external BGP routers to N, processes an update of routing information according to an INPUT policy when the update occurs, determines the best route, and transmits the updated information to the external BGP routers according to an OUTPUT policy.

The INPUT policy is a policy for receiving packets, and it has a filtering function wherein, when an address of a receiving (input) packet is included in an access list after referring to the list, it is determined that the packet is transmitted to the corresponding router, and when the receiving packet is not included in the access list, it is determined that the packet is not transmitted and discarded. The INPUT policy also has a route map function for selecting the shortest path to transmit a packet and for processing a mapping for the selected path, and a damping function for determining whether or not the receiving packet is transmitted in accordance with a threshold value when a flapping occurs. The damping function is a processing function wherein, in the case wherein a threshold value is 10 seconds, when a router turns on and off repeatedly at intervals of 10 seconds or less, a packet is not transmitted via the route connected to the router.

The OUTPUT policy is a policy for output packets contrary to the INPUT policy, and it has a filtering function wherein it is determined which router of an address is used to transmit the packet, or not to transmit the output packet so as to discard it, and a route map function for selecting the shortest path through which to transmit a packet and for processing a mapping for the selected path.

More detailed descriptions of the processes are as follows. When a BGP router receives BGP packets, a central processing unit performs an INPUT process for receiving information, and updates its database. It performs an OUTPUT process in order to transmit the updated information to its peer (another party to receive a packet).

Since the central processing unit performs session management functions with all external BGP routers, when the system capacity is enlarged, the number of external BGP routers is increased so that the extent of the system enlargement has to be limited. That is, as the BGP routers are added, connections between the central processing unit and the BGP routers are increased, and the central processing unit bears a substantial load so that the system performance is debased.

Especially, while flapping (a state in which a router turns on and off repeatedly) often occurs in the router in view of a characteristic of the BGP, many performances are needed for processing a damping when the flapping occurs in a router or tasks in accordance with INPUT/OUTPUT policies.

As a result, in the case wherein the central processing unit performs all BGP processes in accordance with the conventional art, the more the router has connection lines, the more the central processing unit has tasks to process, so that unexpected system trouble occur when designing a large capacity router. Also, since a certain amount of information is frequently exchanged in the BGP in order to exchange routing information between one AS and another AS, there is a problem in that it is not easy to enlarge the scale of the system.

The following patents are considered to be generally pertinent to the present invention, but are burdened by the disadvantages set forth above: U.S. Pat. No. 6,658,000 to Raciborski et al., entitled SELECTIVE ROUTING, issued on Dec. 2, 2003; U.S. Pat. No. 6,636,895 to Li et al., entitled SYSTEM, DEVICE, AND METHOD FOR DISTRIBUTING MULTICAST ROUTING INFORMATION IN A PROTOCOL INDEPENDENT MULTICAST NETWORK, issued on Oct. 21, 2003; U.S. Pat. No. 6,611,872 to McCanne, entitled PERFORMING MULTICAST COMMUNICATION IN COMPUTER NETWORKS BY USING OVERLAY ROUTING, issued on Aug. 26, 2003; U.S. Pat. No. 6,526,054 to Li et al., entitled SYSTEM, DEVICE AND METHOD TRANSITIONING FROM DVMRP TO BGMP FOR INTERDOMAIN MULTICAST ROUTING OVER THE INTERNET MULTICAST BACKBONE, issued on Feb. 25, 2003; U.S. Pat. No. 6,505,255 to Akatsu et al., entitled METHOD FOR FORMATTING AND ROUTING DATA BETWEEN AN EXTERNAL NETWORK AND AN INTERNAL NETWORK, issued on Jan. 7, 2003; U.S. Pat. No. 6,487,172 to Zonoun, entitled PACKET NETWORK ROUTE SELECTION METHOD AND APPARATUS USING A BIDDING ALGORITHM, issued on Nov. 26, 2002; U.S. Pat. No. 6,084,859 to Ratcliff et al., entitled INTERNET PROTOCOL ASSISTS USING MULTI-PATH CHANNEL PROTOCOL, issued on Jul. 4, 2000; U.S. Pat. No. 6,078,963 to Civanlar et al., entitled ROUTER WITH DE-CENTRALIZED PROCESSING USING INTELLIGENT PORTS, issued on Jun. 20, 2000; U.S. Pat. No. 6,055,561 to Feldman et al., entitled MAPPING OF ROUTING TRAFFIC TO SWITCHING NETWORKS, issued on Apr. 25, 2000; and U.S. Pat. No. 6,006,261 to Ratcliff et al., entitled INTERNET PROTOCOL ASSISTS USING MULTI-PATH CHANNEL PROTOCOL, issued on Dec. 21, 1999.

SUMMARY OF THE INVENTION

The present invention has been developed in view of the above problems, and it is an object of the present invention to provide an apparatus for distributively processing a BGP and a method thereof, wherein a central processing unit does not process all tasks for processing the BGP, and distributed BGP processing units are formed in the central processing unit so that each distributed BGP processing unit manages TCP sessions with external BGP routers belonging to the distributed BGP processing unit, and wherein information is internally transmitted in the distributed BGP processing units using a multicast scheme and a broadcast scheme so that loads can be distributed.

In accordance with an aspect of the present invention, there is provided an apparatus for distributively processing a Border Gateway Protocol (BGP), comprising: one or more external BGP routers; and a BGP router for managing the external BGP routers; wherein the BGP router for managing the external BGP routers is connected directly to the external BGP routers, and includes one or more distributed BGP processing units for managing sessions of corresponding external BGP routers connected directly to the managing BGP router.

Preferably, the one or more distributed BGP processing units manage the BGP routers only connected directly to themselves in accordance with an operator's policy, and internally perform an update of update information obtained from other distributed BGP processing units using a multicast scheme or a broadcast scheme.

In accordance with another aspect of the present invention, there is provided a method for distributively processing the update information among a number of distributed BGP processing units when an update of a BGP router is generated, the method comprising: causing a first distributed BGP processing unit to receive update information in accordance with a change of route information from an arbitrary external BGP router; deciding whether the received BGP update information is to be transmitted to another distributed BGP processing unit; selecting the shortest path and processing a mapping of the selected path; and processing an INPUT policy by deciding whether the update information is to be transmitted in accordance with a threshold value when a flapping occurs.

Preferably, in the case wherein the BGP update information is to be transmitted to a second distributed BGP processing unit in accordance with the result of the INPUT policy of the second step, the method includes the further steps of: transmitting the BGP update information to the second distributed BGP processing unit using a multicast scheme or a broadcast scheme; enabling the second distributed BGP processing unit to process an OUTPUT policy which determines whether corresponding information is to be transmitted to the external BGP routers connected directly to the second distributed BGP processing unit when the second distributed BGP processing unit receives the BGP update information; and transmitting the BGP update information to the corresponding external BGP routers when the external BGP routers are to receive the BGP update information in accordance with the OUTPUT policy.

In accordance with yet another aspect of the present invention, there is provided a method for matching information of a newly added distributed BGP processing unit with an existing distributed BGP processing unit, comprising the steps of: generating a newly added distributed BGP processing unit, and enabling the newly added distributed BGP processing unit to initialize itself; informing the existing distributed BGP processing unit of the fact that the added distributed BGP processing unit is initialized using a multicast HELLO packet; enabling the existing distributed BGP processing unit to transmit a connect signal to a corresponding distributed BGP processing unit so as to try to make a connection when the distributed BGP processing unit receives the HELLO packet; in the case wherein a connection is made between the added distributed BGP processing unit and an adjacent distributed BGP processing unit in accordance with the connect signal, enabling the adjacent distributed BGP processing unit to transmit BGP update information in order to match both information, and in the case wherein the transmitted BGP update information is received, performing an update of the added distributed BGP processing unit by itself in accordance with the received update information.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a diagram illustrating a procedure performed when a BGP processing unit is added in accordance with another embodiment of the present invention.

DETAILED DESCRIPTION OF THE PREFERRED EMBODIMENTS

Preferred embodiments of the present invention will now be described in detail with reference with the annexed drawings in order that those skilled in the art can embody the present invention with ease.

Figure 1:
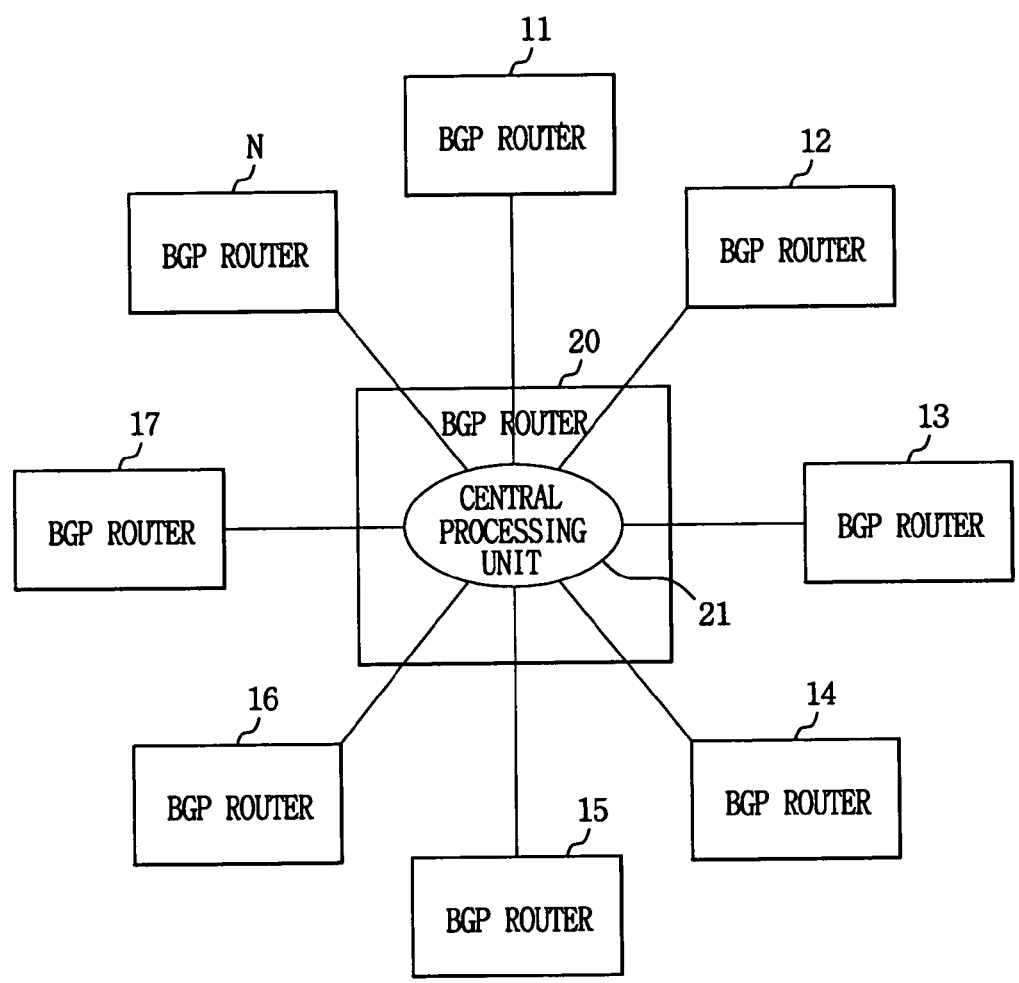
FIG. 1 is a block diagram of a BGP router system.

FIG. 1 is a block diagram of a BGP router system.

Referring to FIG. 1, the BGP router system comprises a number of BGP routers 11 to N existing externally, and a BGP router 20 corresponding to a server. The BGP router 20 may include a central processing unit 21.

The central processing unit 21 manages all external BGP routers 11 to N, processes an update of routing information according to an INPUT policy when the update occurs, determines the best route, and transmits the updated information to the external BGP routers according to an OUTPUT policy.

The INPUT policy is a policy for receiving packets, and it has a filtering function wherein, when an address of a receiving (input) packet is included in an access list after referring to the list, it is determined that the packet is transmitted to the corresponding router, and when the receiving packet is not included in the access list, it is determined that the packet is not transmitted and discarded. The INPUT policy also has a route map function for selecting the shortest path over which to transmit a packet and for processing a mapping for the selected path, and a damping function for deciding whether or not the receiving packet is transmitted in accordance with a threshold value when a flapping occurs. The damping function is a processing function wherein, when a threshold value is 10 seconds, and when a router turns on and off repeatedly at intervals of 10 seconds or less, a packet is not transmitted over the route connected to the router.

The OUTPUT policy is a policy for output packets contrary to the INPUT policy, and it has a filtering function wherein it is determined which router of an address is used to transmit the packet, or not to transmit the output packet so as to discard it, and a route map function for selecting the shortest path over which to transmit a packet and processing a mapping for the selected path.

More detailed descriptions of the processes are as follows. When a BGP router 20 receives BGP packets, a central processing unit 21 performs an INPUT process for receiving information, and updates its database. And it performs an OUTPUT process in order to transmit the updated information to its peer (another party to receive a packet).

Since the central processing unit 21 performs session management functions with all external BGP routers, when the system capacity is enlarged, the number of external BGP routers is increased so that the extent of the system enlargement has to be limited. That is, as the BGP routers are added, connections between the central processing unit and the BGP routers are increased, and the central processing unit 21 bears a substantial load so that the system performance is debased.

Especially, while flapping (a state that a router turns on and off repeatedly) often occurs in the router in view of a characteristic of the BGP, many performances are needed for processing a damping when the flapping occurs in a router or tasks in accordance with INPUT/OUTPUT policies.

As a result, in the case wherein the central processing unit 21 performs all BGP processes, the more the router 20 has connection lines, the more the central processing unit 21 has tasks to process, so that unexpected system trouble may occur when designing a large capacity router. Also, since a certain amount of information is frequently exchanged in the BGP in order to exchange routing information between one AS and another AS, there is a problem in that it is not easy to enlarge the scale of the system.

Figure 2:
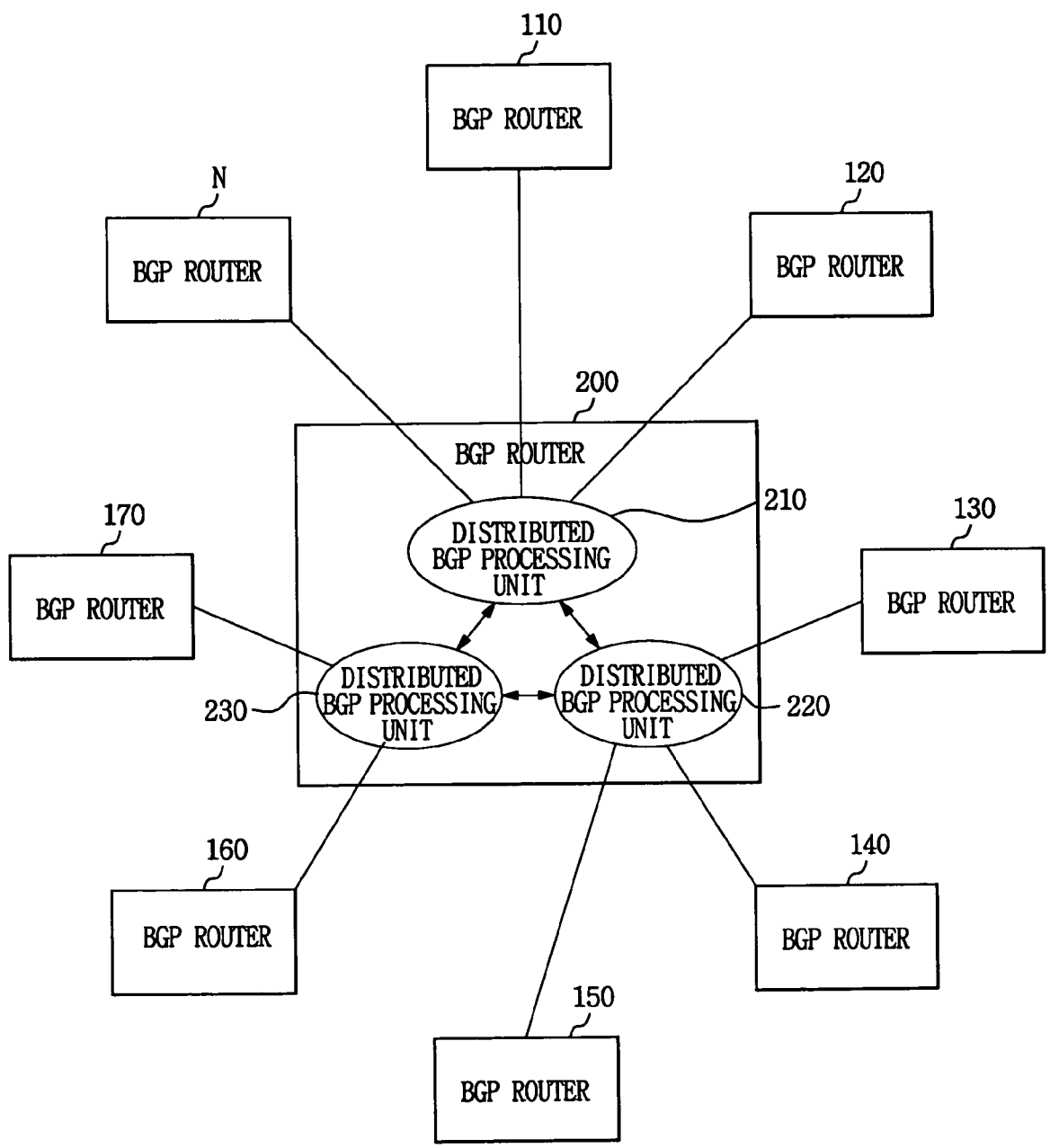
FIG. 2 is a block diagram of an apparatus for distributively processing a BGP in accordance with an embodiment of the present invention.

FIG. 2 is a block diagram of an apparatus for distributively processing a BGP in accordance with an embodiment of the present invention.

Referring to FIG. 2, a router system made up of distributed BGP processing units comprises a number of BGP routers 110 to N existing externally, and a BGP router 200 corresponding to a server. The BGP router 200 may include a number of distributed BGP processing units 210, 220 and 230.

Each distributed BGP processing unit 210, 220 and 230 manages BGP routers connected directly to it in accordance with operator's policy, and information obtained by other distributed BGP processing units is transmitted through an internal BGP processing unit.

For example, since the distributed BGP processing unit 210 is directly connected to the BGP routers 110, 120 and N, it manages the BGP routers 110, 120 and N only. Since the distributed BGP processing unit 220 is directly connected to the BGP routers 130, 140 and 150, it manages the BGP routers 130, 140 and 150 only, and since the distributed BGP processing unit 230 is directly connected to the BGP routers 160 and 170, it manages BGP routers 160 and 170 only.

In the case wherein BGP update information received in the distributed BGP processing unit 210 is needed in another distributed BGP processing unit 220 or 230, the BGP update information is internally updated between the distributed BGP processing unit 210 and the distributed BGP processing unit 220 or 230 using a multicast scheme or a broadcast scheme.

First of all, the case wherein the BGP update information is transmitted from the external BGP routers 110 to 170 and N to the distributed BGP processing units 210, 220 and 230 will be described.

When the distributed BGP processing units 210, 220 and 230 receive the BGP update information from the corresponding external BGP routers connected directly to them, the distributed BGP processing units 210,220 and 230 perform a filtering function which determines whether or not a route is transmitted in accordance with an INPUT policy, a route-map function for mapping the shortest transmission path, and a damping function which determines whether or not the update information is transmitted in accordance with a threshold value when flapping occurs.

The received BGP update information is transmitted to other distributed BGP processing units in accordance with the result of the processing. When there exists an external BGP router other than the peer received, the external BGP router is informed of the results of the filtering and the route-map in accordance with an OUTPUT policy.

On the other hand, when the distributed BGP processing units 210, 220 and 230 internally receive the BGP update information among them, they directly perform the route decision process without performing the INPUT policy process, and then inform the external BGP router of the results of the filtering and the route-map in accordance with the OUTPUT policy.

Hereinafter, processes of the distributed BGP processing units in the case wherein update information is generated in an arbitrary external BGP router will be described.

Figure 3:
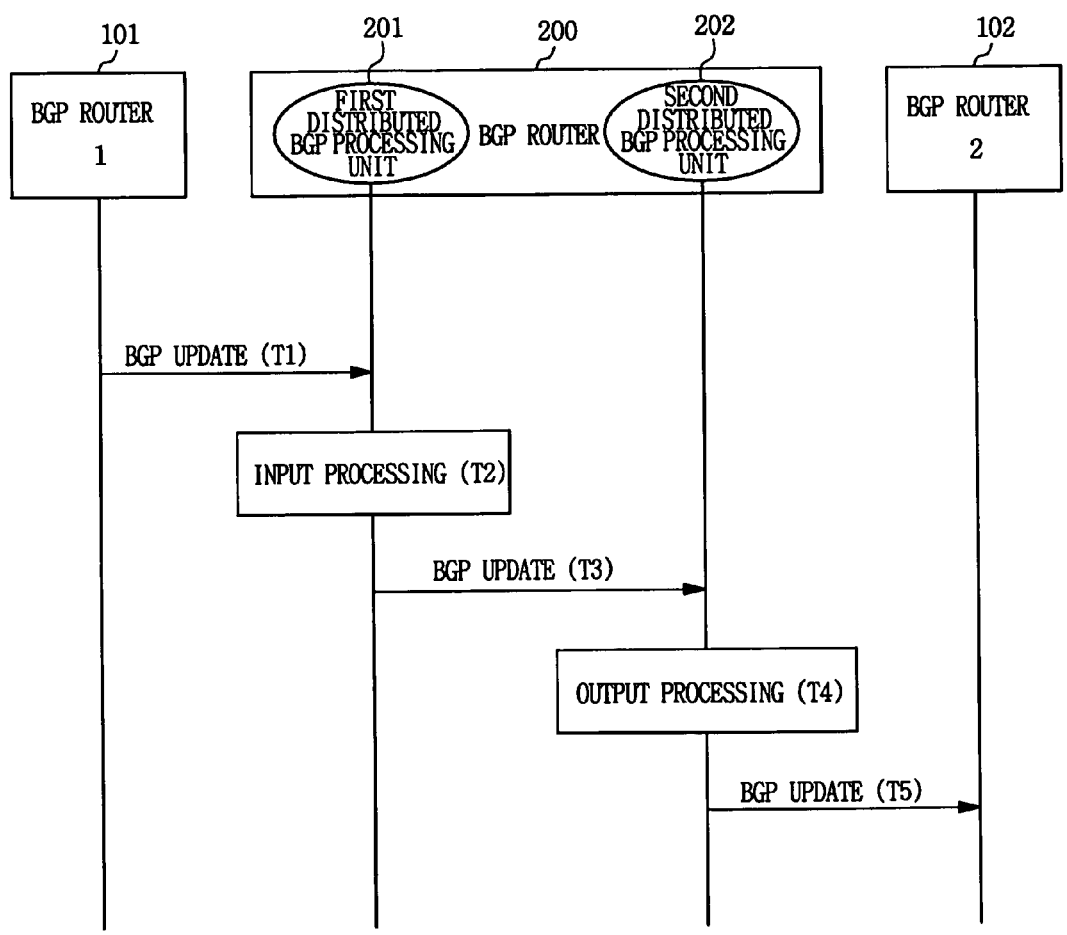
FIG. 3 is a diagram illustrating a BGP distribution processing procedure in accordance with an embodiment of the present invention.

FIG. 3 is a diagram illustrating a BGP distribution processing procedure in accordance with an embodiment of the present invention.

Referring to FIG. 3, when a BGP router 200 receives BGP update information from a first external BGP router 101 in accordance with a change of a BGP route information (T1), a first corresponding distributed BGP processing unit 201 obtains the information by managing an external session, and determines whether the received BGP update information is to be transmitted to a second distributed BGP processing unit 202 in accordance with an INPUT policy (T2).

The INPUT policy determines how to process a route-map function for a transmission path mapping and a damping function to decide whether or not the update information is transmitted in accordance with a threshold value.

In the case wherein the changed BGP update information need not be transmitted to another unit, that is, the second distributed BGP processing unit 202, the first distributed BGP processing unit 201 alone manages corresponding information and does not transmit it to the second distributed BGP processing unit 202.

When BGP information is updated in the second distributed BGP processing unit 202 in accordance with an INPUT policy of the first distributed BGP processing unit 201 (T3), the second distributed BGP processing unit 202 determines whether the corresponding information is to be transmitted to a second external BGP router 102 connected directly to the unit 202 in accordance with OUTPUT policy of the unit 202 itself (T4).

The OUTPUT policy determines how to process a route-map function for a transmission path mapping.

When it is determined that the information is to be transmitted to the external second BGP router 102 in T4, the BGP update information is transmitted to the second BGP router 102 (T5).

Accordingly, since the distributed BGP processing units 201 and 202 share in the tasks and the BGP information is transmitted to the external BGP routers connected directly to the distributed BGP processing units, the load is divided.

Hereinafter, a procedure is described, wherein, when a new distributed BGP processing unit is added, information is matched between the distributed BGP processing units.

FIG. 4 is a diagram illustrating a procedure performed when a BGP processing unit is added in accordance with another embodiment of the present invention.

Taking an example wherein a first distributed BGP processing unit 201 is in the operating state (T11) and a second distributed BGP processing unit 202 is newly added, the second distributed BGP processing unit 202 performs a self-initialization (T12).

After the initialization is performed, the first distributed BGP processing unit 201 is internally informed of the initialization of the second distributed BGP processing unit 202 through a multicast HELLO packet (T13). The first distributed BGP processing unit 201 receives the information, and then makes a connection to the second distributed BGP processing unit 202 (T14). At this point, the procedure is performed in a connection scheme, taking reliability into consideration.

After the connection is completed, update information from the first distributed BGP processing unit 201 is transmitted to the second distributed BGP processing unit 202 in order to match the information of both distributed BGP processing units (T15).

After performing the procedure of matching the information of the distributed BGP processing units in the initialization process in accordance with the generation of the new distributed BGP processing unit, the case wherein update information is received from an external BGP router is as follows.

In the state wherein a session has been completed between the second distributed BGP processing unit 202 and a second BGP router 102 (T16), when the second distributed BGP processing unit 202 receives update information from the second BGP router 102 (T17), the second distributed BGP processing unit 202 performs the following processes.

At first, the second distributed BGP processing unit 202 updates corresponding information in a Routing Information Base (RIB) for its external peer, and performs a filtering function, a route-map function and a damping function in accordance with the INPUT policy.

The second distributed BGP processing unit 202 transmits update information to an internal peer (a distributed BGP processing unit), performs a decision process so as to select the shortest route, and transmits the update information to an external peer (the second BGP router) when the result of the selection is different from the previous one in accordance with an OUTPUT policy (T18).

When the first distributed BGP processing unit 201 receives update information from the second distributed BGP processing unit 202 (T19), the first distributed BGP processing unit 201 selects the shortest route by performing the decision process, and transmits update information to the external peer (the first BGP router) in accordance with an OUTPUT policy when the result of the selection is different from the previous one (T20).

When it is determined that update information is transmitted to the external BGP router in accordance with the OUTPUT policy in T20, the BGP update information is transmitted to the first BGP router 101 (T21).

Since processes T22 to T26 are the same as the processes T17 to T21 described above, explanation of them is omitted. For reference, the processes T17 to T21 explain a case wherein the update information is generated in the second BGP router 102, and the processes T22 to T26 explain a case wherein update information is generated in the first BGP router 101.

As described above, in accordance with the present invention, each distributed BGP processing unit distributively manages sessions with external BGP routers instead of a central processing unit of a BGP router corresponding to a server managing all sessions with the external BGP routers, so that system performance is enhanced. And, even though the number of the external BGP routers increases, it does not have an important effect upon the system performance so that it is easy to extend the system.

Although preferred embodiments of the present invention have been described, it will be understood by those skilled in the art that the present invention should not be limited to the described preferred embodiments. Rather, various changes and modifications can be made within the spirit and scope of the present invention, as defined by the following claims.

What is claimed is:

1. An apparatus for distributively processing a border gateway protocol (BGP), comprising:
    at least one external BGP router; and
    a BGP router for managing said at least one external BGP router;
    wherein the BGP router for managing said at least one external BGP router is connected directly to said at least one external BGP router, and includes at least one distributed BGP processing unit for managing a session of said at least one external BGP router connected directly to the managing BGP router; and
    wherein said at least one distributed BGP processing unit only manages said at least one BGP router connected directly to it in accordance with an operator policy, and internally performs an update with update information obtained from other distributed BGP processing units using one of a multicast scheme and a broadcast scheme.

2. The apparatus according to claim 1, wherein, when said at least one distributed BGP processing unit receives update information from said at least one external BGP router, said at least one distributed BGP processing unit performs a filtering function to determine whether a route is transmitted in accordance with an INPUT policy.

3. The apparatus according to claim 2, wherein, when said at least one distributed BGP processing unit receives update information from said at least one external BGP router, said at least one distributed BGP processing unit performs a router-map function for mapping a shortest transmission path.

4. The apparatus according to claim 3, wherein, when said at least one distributed BGP processing unit receives update information from said at least one external BGP router, said at least one distributed BGP processing unit performs a damping function to determine whether the update information is transmitted in accordance with a threshold value when flapping occurs.

5. The apparatus according to claim 1, wherein, when said at least one distributed BGP processing unit receives update information from said at least one external BGP router, said at least one distributed BGP processing unit performs a router-map function for mapping a shortest transmission path.

6. The apparatus according to claim 5, wherein, when said at least one distributed BGP processing unit receives update information from said at least one external BGP router, said at least one distributed BGP processing unit performs a damping function to determine whether the update information is transmitted in accordance with a threshold value when flapping occurs.

7. The apparatus according to claim 1, wherein, when said at least one distributed BGP processing unit receives update information from said at least one external BGP router, said at least one distributed BGP processing unit performs a damping function to determine whether the update information is transmitted in accordance with a threshold value when flapping occurs.

8. A method for distributively processing update information among a plurality of distributed border gateway protocol (BGP) processing units when an update of a BGP router is generated, said method comprising the steps of:

causing a first distributed BGP processing unit to receive update information in accordance with a change of route information from an arbitrary external BGP router;

deciding whether the received BGP update information is to be transmitted to another distributed BGP processing unit;

selecting a shortest path and processing a mapping of the selected shortest path; and processing an INPUT policy by deciding whether the update information is to be transmitted in accordance with a threshold value when flapping occurs;

said method further comprising the step of internally performing an update with the update information received from the arbitrary external BGP router using one of a multicast scheme and a broadcast scheme.

9. The method according to claim 8, wherein, when the BGP update information is to be transmitted to a second distributed BGP processing unit in accordance with the processing of the INPUT policy, the method includes the further steps of:

transmitting the BGP update information to the second distributed BGP processing unit using one of the multicast scheme and the broadcast scheme;

enabling the second distributed BGP processing unit to process an OUTPUT policy which determines whether corresponding information is to be transmitted to at least one external BGP router connected directly to the second distributed BGP processing unit when the second distributed BGP processing unit receives the BGP update information; and transmitting the corresponding information to said at least one external BGP router when it is determined that said at least one external BGP router is to receive the BGP update information in accordance with the OUTPUT policy.

10. The method according to claim 9, wherein the OUTPUT policy is used to determine how to process a route map function for a transmission path mapping.

11. The method according to claim 8, wherein said processing step comprises performing a damping function to determine whether the update information is transmitted in accordance with a threshold value when flapping occurs.

12. A method for matching information of a newly added distributed border gateway protocol (BGP) processing unit with an existing distributed BGP processing unit, comprising the steps of:

establishing the added distributed BGP processing unit and causing the added distributed BGP processing unit to initialize itself;

informing the existing distributed BGP processing unit of the fact that the added distributed BGP processing unit is initialized using a multicast HELLO packet;

when the existing distributed BGP processing unit receives the HELLO packet, causing the existing distributed BGP processing unit to transmit a connect signal to the added distributed BGP processing unit so as to make a connection between the existing distributed BGP processing unit and the added distributed BGP processing unit;

when the connection is made between the existing distributed BGP processing unit and the added distributed BGP processing unit in accordance with the connect signal, causing the existing distributed BGP processing unit to transmit BGP update information to the added distributed BGP processing unit in order to obtain a match therebetween; and when the transmitted BGP update information is received, performing an update of the added distributed BGP processing unit in accordance with the received update information.

13. The method according to claim 12, further comprising the step of:

when the added distributed BGP processing unit receives the BGP update information from an external BGP router, causing the added distributed BGP processing unit to update corresponding information in a Routing Information Base (RIB).

14. The method according to claim 13, wherein the added distributed BGP processing unit also performs a filtering function to determine whether a route is transmitted in accordance with an INPUT policy.

15. The method according to claim 14, wherein the added distributed BGP processing unit also performs a route-map function for mapping a shortest transmission path.

16. The method according to claim 15, wherein the added distributed BGP processing unit also performs a damping function to determine whether the update information is transmitted in accordance with a threshold value when flapping occurs.

17. The method according to claim 13, wherein the added distributed BGP processing unit also performs a route-map function for mapping a shortest transmission path.

18. The method according to claim 17, wherein the added distributed BGP processing unit also performs a damping function to determine whether the update information is transmitted in accordance with a threshold value when flapping occurs.

19. The method according to claim 13, wherein the added distributed BGP processing unit also performs a damping function to determine whether the update information is transmitted in accordance with a threshold value when flapping occurs.

* * * * *